Patented Apr. 13, 1937

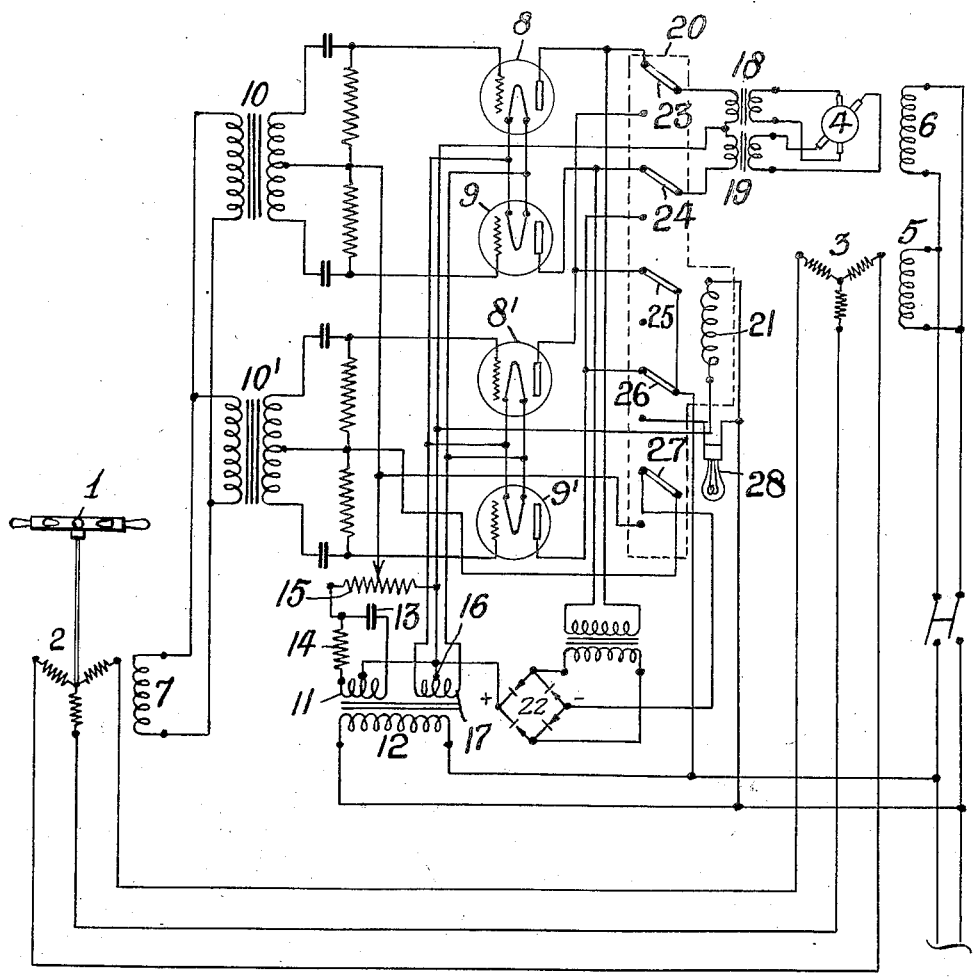

2,077,179

UNITED STATES PATENT OFFICE 2,077,179

STANDBY TUBE SYSTEM

Francis L. Moseley, Pelham, N. Y., and John L. Bird, Radburn, N. J., assignors to Sperry Gyroscope Company, Inc., Brooklyn, N. Y., a corporation of New York Application November 7, 1934, Serial No. 751,808

5 Claims. (Cl. 250—27)

This invention relates to an electron tube control system for controlling the position of heavy objects by controlling the direction, torque and speed of an electric motor driving the same. The invention has special application to the positional control of heavy objects from a distance, such as the control of a ship's rudder from the pilot house, the control of a searchlight from a distant observing station, and the like.

When electron tubes are used for this purpose, there is of course constant danger that one of the tubes may fail, resulting in loss of control. The purpose of the present invention is to provide an auxiliary or spare tube supply which is instantly available for taking over the control of the motor in case the regular tubes fail.

While our invention is applicable to many types of motor control through electron tubes, we have shown the same applied to the control of a repulsion motor by a system disclosed in the prior application of one of the present applicants, i. e., Francis L. Moseley, Serial No. 689,075, for Remote control of heavy objects, filed September 12, 1933, Patent No. 2,008,364, July 16, 1935.

The single figure of the drawing shows one method of applying our invention to the aforesaid system, in which a ship's rudder is shown as controlled from the pilot wheel 1 through inductive signal devices of the self-synchronous repeater system type. The pilot wheel is shown as turning one part of the self-synchronous a-c inductive generator 2. The polyphase winding of said generator is connected to a similar winding of a similar inductive device 3 on the shaft of the power motor 4 which turns the rudder directly or indirectly. A single phase supply supplies current to a stationary winding on one of said inductive devices. As shown, the supply is connected to winding 5 on device 3 and is also shown as exciting the field 6 of the motor 4. Any relative displacement between the armatures 2 and 3 induces a voltage in one direction or the other in the winding 7 on generator 2. The signal from this or any other suitable source operates to control one or more electron tubes 8 and 9 which are preferably of the grid controlled rectifier type (gas or vapor filled).

As shown, the signal is amplified and divided by a transformer 10 so that opposite phases are applied to the grids of the tubes 8 and 9 in such a manner that the phases of the grids in the two tubes are oppositely shifted in accordance with the magnitude and direction of the signal, giving a graduated, smooth control. For this purpose we employ a system of dynamic phase shift in which an a-c bias voltage is added to the signal voltage to produce phase shift on the grids. Such voltages may be supplied from a phase shift bridge network comprising a center tapped secondary 11 on a transformer 12 excited from the main supply, a condenser 13 and resistance 14. Resistance 15 is connected between the center tap of secondary 11 and the connection between resistance 14 and condenser 13. It serves as a magnitude adjustment for the a-c bias. Secondary 17 acts as the heater supply for the filaments of said tubes. The plates of said tubes are connected across the high voltage secondaries of transformers 18 and 19, which serve to control the short-circuiting of the two sets of brushes on repulsion motor 4, by which the direction and speed of the motor is controlled, as will be readily understood.

In order to prevent loss of motor control by the failure of either of the tubes 8 or 9, we provide a second pair of tubes 8' and 9' which are preferably continuously maintained in condition for instant operation. Thus the filaments are connected in parallel with the filaments of the tubes 8 and 9 to the heater winding 17. Also, the plates are continuously supplied with a-c from the main supply and the grids are supplied with signal voltage from the transformer 10' connected in parallel with the transformer 10. The a-c bias voltage applied between center tap of the filaments of the tubes 8 and 9 and the center tap of transformer 10 is, however, normally disconnected from tubes 8' and 9' and also the output of said tubes is normally disconnected from the transformers 18 and 19, controlling the motor 4. A relay or switching device 20 is provided for transferring the plates of the tubes 8' and 9' to the motor circuit and for giving said tubes the proper grid bias whenever either of the tubes 8 or 9 fails. Said relay is normally closed in the position shown in the diagram, but all of said switches are thrown or revolved in a counter-clockwise direction in the figure to complete a second set of contacts upon the excitation of the solenoid winding 21, said relay solenoid being placed preferably in the plate circuit of tubes 8' and 9'. In the normal position of the relay the plate circuit of tubes 8 and 9 is completed through the upper relay contacts to the transformers 18 and 19.

The spare tube plates are connected to one side of the a-c supply. The other side of said supply is connected to one side of the solenoid 21, which in turn is connected to the cathodes of the spare tubes. When the tubes 8 and 9 are operating to control the motor, there exists a potential difference between the plates of said tubes. This voltage is rectified by any suitable device, such as the bridge connected copper oxide rectifier 22, and supplied as a d-c grid bias for the spare tubes, which normally keeps them inoperative.

In normal operation, whenever a signal is applied to the system to cause motor operation, it appears in the grid circuits of both the regular and spare tubes simultaneously. The regular tubes function to drive the motor with a resultant voltage difference between the plates thereof. This voltage, rectified, provides sufficient d-c grid bias on the spare tubes to prevent either one from passing current, thus preventing opening of the relay 20. Should a failure occur in either of the tubes 8 or 9 while responding to control voltage in the grid circuits, there no longer exists the voltage across the plates thereof and consequently no d-c bias is applied to the spare tubes. The instant this failure occurs, one or the other of the spare tubes passes current, which excites solenoid 21 and throws the relay switches 20. The consequent moving of switch arms 23 and 24 disconnects the regular tube plate circuits from transformers 18 and 19 and completes the spare tube plate connections to said transformers. The switch arms 25, 26 also disconnect the a-c line from the spare tube plates. Switch arm 27 serves to disconnect the d-c grid bias circuit and connects the a-c bias created by the phase shift bridge 11, 13, 14, 15 with the tubes 8' and 9' in the same manner in which it was originally connected to tubes 8 and 9. In this position the spare tube circuits are identical with the original regular tube circuits and operate in the same manner. The transfer thus occurs without loss of control of motor action or appreciable time delay. Switch 26 also completes the circuit of a signal lamp 28, so that a warning is given whenever the main tubes 8 and 9 have failed.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an electron tube system, an electron tube having a filament, grid and plate, means for heating the filament, supplying suitable plate voltage thereto and for controlling the grid thereof, a standby electron tube having a filament, grid and plate, the filament, plate and grid of which are normally supplied from said first named means, and rectifier means for supplying a rectified grid bias potential to said standby tube from the plate circuit of said first tube, such rectified grid bias potential being of such magnitude and polarity as to render said standby tube normally inoperative, said rectifier means becoming inoperative upon the failure of said first tube, whereby upon failure of such tube said rectified grid bias potential is removed so that said standby tube becomes operative.

2. In an electron tube system, an electron tube having a filament, grid and plate, means for heating the filament, supplying suitable plate voltage thereto and for controlling the grid thereof, a standby electron tube having a filament, grid and plate, the filament, plate and grid of which are normally supplied from said first named means, rectifier means for supplying a rectified grid bias potential to said standby tube from the plate circuit of said first tube, such rectified grid bias potential being of such magnitude and polarity as to render said standby tube normally inoperative, said rectifier means becoming inoperative upon the failure of said first tube, whereby upon failure of such tube said rectified grid bias potential is removed so that said standby tube immediately becomes operative, and switching means for substituting said standby tube for said first tube.

3. In an electronic control system, a pair of opposed grid control tubes having filaments, grids and plates, means for heating the filaments thereof, means for supplying a-c voltages to the plates thereof, means for oppositely controlling the phase on the grids thereof, a pair of standby grid control tubes having filaments, grids and plates, the filaments of which are normally supplied from the same source as the filaments of the first pair of tubes, and means for supplying grid bias to the grids of the standby tubes from the voltage difference on the plates of the first tubes, such grid bias being of such magnitude and polarity as to render said standby tubes normally inoperative, whereby upon failure of said first tubes resulting in the elimination of the voltage difference between the plates of the first tubes and consequent removal of said grid bias from said standby tubes, said standby tubes are caused to become operative.

4. In an electronic control system, a pair of opposed grid control tubes having filaments, grids and plates, means for heating the filaments thereof, means for supplying a-c voltages to the plates thereof, means for oppositely controlling the phase on the grids thereof, a pair of standby grid control tubes having filaments, grids and plates, the filaments of which are normally supplied from the same source as the filaments of the first pair of tubes, means including a rectifier for supplying rectified grid bias potential to the grids of the standby tubes from the voltage difference on the plates of the first tubes, such rectified grid bias potential being of such magnitude and polarity as to render said standby tubes normally inoperative, whereby upon failure of said first tubes and the resultant shutting off of said rectified grid bias potential, said standby tubes become operative, and switching means for transferring control from the first to the standby pair of tubes brought into action upon activation of said standby tubes.

5. In an electronic control system, a pair of opposed grid control tubes having filaments, grids and plates, means for heating the filaments thereof, means for supplying a-c voltages to the plates thereof, an a-c dynamic phase displacing device for producing an a-c bias voltage, means for combining said bias voltage with an incoming signal for oppositely controlling the phase on the grids thereof, a pair of standby grid control tubes having filaments, grids and plates, the filaments and plates of which are normally supplied from the same sources as the respective elements of the first pair of tubes, and the grids of which have said signal impressed thereon, rectifier means for supplying rectified grid bias potential to the grids of the standby tubes, said rectifier means being energized from the voltage difference on the plates of the first tubes, such rectified grid bias potential being of such magnitude and polarity as to render said standby tubes normally inoperative, whereby upon failure of said first tubes and resultant shutting off of said rectified grid bias potential, said standby tubes become operative, and switching means for throwing said phase displacing device into the grid circuits of said standby tubes and for transferring control from the first to the standby pair of tubes brought into action upon activation of said standby tubes.

FRANCIS L. MOSELEY.
JOHN L. BIRD.